March 31, 1925.

J. E. HUNT

1,531,484

OIL INDICATING DEVICE FOR AUTOMOBILES

Filed Sept. 2, 1924

INVENTOR.
John E. Hunt
ATTORNEY.

Patented Mar. 31, 1925.

1,531,484

UNITED STATES PATENT OFFICE.

JOHN E. HUNT, OF LOS ANGELES, CALIFORNIA.

OIL-INDICATING DEVICE FOR AUTOMOBILES.

Application filed September 2, 1924. Serial No. 735,532.

*To all whom it may concern:*

Be it known that I, JOHN E. HUNT, a citizen of the United States, and a resident of Los Angeles, in the county of Los Angeles and State of California, have invented new and useful Improvements in Oil-Indicating Devices for Automobiles, of which the following is a specification.

This invention relates to and has for a main object the provision of means attachable to the differential housing of a motor propelled vehicle for ascertaining the presence or absence of a sufficient quantity of lubricating oil in the housing, and capable of being set and normally held in non-indicating position, and of being manually operated, at will, for the purpose stated.

Another object is to provide in connection with the differential housing an indicator, or "feeler," with a blade, vane or float within the housing and an operating member externally thereof, adapted to be locked normally against operation, and capable of being released for turning the "feeler" in the housing so that the resistance of the oil in the housing will be evidenced in the movement of the divide and the approximate level of the lubricant ascertained, without removing the usual plug.

Other and more detailed objects of my invention will appear during the course of the description of my improvements hereinafter following.

In the accompanying drawings I have illustrated a preferred form of device, susceptible of change, within the scope of the appended claims, without departing from the spirit of my invention.

Figure 1:
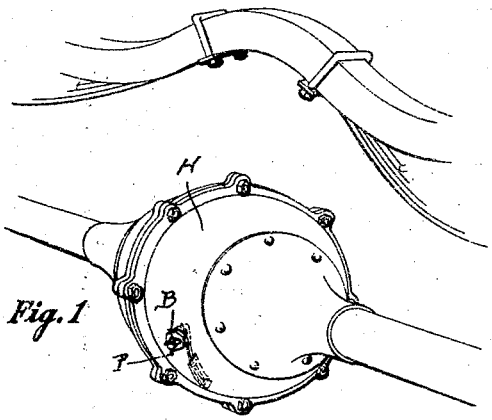
Fig. 1 is a perspective view of a portion of the rear axle housing and springs of an automobile to which my improvements are attached for use.
Figure 2:
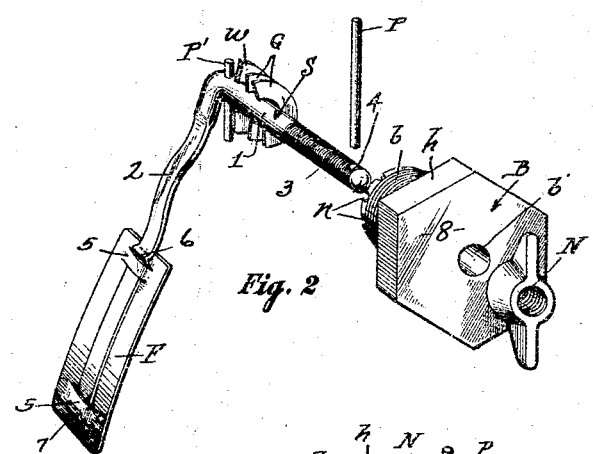
Fig. 2 is a perspective view of substantially full size, showing the several members of the device in readiness for assembly and connection to the housing of an automobile rear axle.

In the preferred form my improved device includes as main elements, a body member B adapted to replace the usual filling plug of a housing H such as shown in Fig. 1, an operating stem S which has a horizontally disposed portion 1 and right angularly bent portion 2, a float or feeler F held on the portion 2 of stem S, a nut N adapted to be threaded on the outer end of stem S, and a washer W and gaskets G, G, on the inner portion of stem S.

Body member B has a hexagonal head $h$ to which a wrench may be applied for screwing the externally threaded portion $b$ into the wall of the housing. A longitudinal bore $b'$ is provided centrally in the body B, through which the stem S extends and the outer portion 1 of said stem is threaded at 3 to receive the nut N externally of the head $h$ of body B. Portion 1 of said stem also has a transverse bore 4 therethrough into which is driven a pin P of substantial length, for holding said pin in substantially the radial plane of the portion 2 of stem S.

The inner portion of stem S above the portion 2 thereof is also provided with a similar bore in which is held a shorter pin P'. When the stem is assembled on the body B the nut N will be movably held on the outer portion of the stem S between the head $h$ of body B and the nut N, so that said nut may be adjusted slightly so as to loosen the stem for operation as an indicator.

Figure 3:
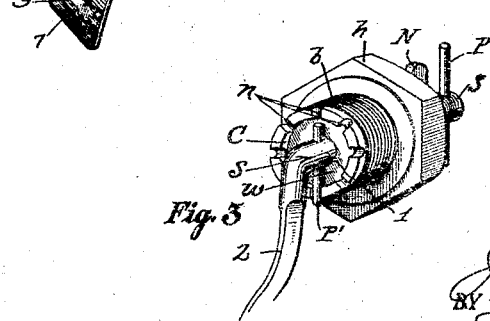
Fig. 3 is a perspective view of a portion of the assembled device from the inner side thereof.

The washer W and gaskets G, G, are adapted to seat in a counterbore C formed in the inner end of body portion $b$, and the pin P' limits the inward movement of said washer and said gaskets as shown in Fig. 3. It will also be observed that pin P' is extended from the periphery of stem S to a greater extent on one end than on the other, so that the long end thereof may selectively engage notches $n$, $n$, etc., formed on the inner end of the body B.

Portion 2 of stem S is peculiarly bent and flattened in the process of manufacture so as to clear the mechanism within the housing H of the automobile, and a feeler F is suitably held on the end thereof by means of loops 5, 5 cut away from the metal of the feeler or blade and bent portions 6 and 7 are formed on the portion 2 of the stem adjacent the outer edges of said loops for preventing the movement of the feeler on the stem. I have shown the feeler made of flat sheet metal but the same may be otherwise formed of light material, such as cork, or may be made in the form of a float, if desired.

Now in operation, the body plug B is tightly threaded into the filling opening of housing H and the stem S is turned by means of the pin P so that said pin will be vertically disposed for indicating that the device is inoperatively set. Thereafter the nut N is threaded inwardly on the stem S and tightened against the outer face 8 of the body B. Thus the washer W and gaskets G are moved into the counterbore C of the body and are so held by the pin P', thus serving to pack the gland against leakage of the oil through the bore b'. When so set the feeler F will be also vertically positioned and will clear the mechanism within the housing H during the movement of the vehicle.

When it is desired to ascertain the quantity of lubricant in housing H the nut N is loosened so that the stem S may be moved inwardly of the body B slightly and then turned gradually in a counter-clockwise direction, preferably. The pin P' will then be clear of the notched end of the body B and the presence or absence of oil may be readily established, due to the resistance to the movement of the feeler if oil is present, or, due to the lack of such resistance if there should be no oil in the housing H. Of course if the level of oil below normal such a level will be noticed by the movement of the feeler and the approximate level thereof determined.

In the use of my device it is important that the device should be locked against operation during the movement of the vehicle for the reason that the space within the housing H is not large and it is not desirable to have the feeler floating in the housing. To this end the nut N is provided. Furthermore it is desirable to lock the feeler in its lowermost position in the housing and for this purpose the pin P is provided and the notches on the body B are so arranged that when pin P is disposed vertically feeler F will point downwardly and pin P' will engage one of the notches on the body.

While the stem S is bent substantially at right angles the length thereof is sufficient that the entire device may be readily inserted in and removed from the housing H through the filling aperture usually provided and usually closed by a suitable plug, not shown.

What I claim is:

1. In a device of the character described the combination of a housing, a plug removably attached thereto, and a feeler operably supported in said plug and enclosed by said housing, and means externally of the housing for locking said feeler against operation for rendering the same operative, for the purpose described.

2. In a device of the character described the combination with a housing of a plug attachable thereto, a stem rotatably supported in said plug and adjustable longitudinally thereof, a feeler on the inside of said housing attached to said stem, and means externally of the housing for selectively rendering said feeler operative and inoperative at will, for the purpose described.

3. In a device of the character described the combination with a housing of a member enclosed thereby, an operating member therefor having a portion extended outwardly from the housing, means for locking said member against operation, and means for rotating said member when the same is unlocked, for the purpose described.

4. In a device of the character described, a supporting member adapted to be attached to a housing, a stem rotatably and reciprocably mounted in said supporting member, a feeler on said stem adapted to be enclosed by said housing, means on the outer end of said stem for indicating the position of said feeler, and means also on the outer end of said stem for rendering said feeler operative and inoperative at will.

5. In a device of the character described a plug adapted to be attached to a housing and having a central bore therethrough, a stem rotatably and reciprocably mounted in said bore and having an annular extension on the inner end thereof, a feeler carrier on said extension, a locking device on said stem engaging the inner end of said plug, a nut on the outer end of said stem engaging the outer end of said plug for rendering said feeler inoperative and adapted when disengaged from said plug to render said feeler operative, as described.

6. A device of the character described including a body member with a central bore extending therethrough, a stem having a horizontal portion held in said bore, and an annular portion, a feeler on said annular portion, a plurality of notches formed on the inner end of said plug, means on said stem adapted to engage said notches for holding said stem against rotation, means on the outer end of said stem for engagement with the outer end of said plug for rendering said locking device effective, and means also on the outer end of said stem alined with said feeler for indicating the position thereof.

7. A device of the character described including a body member, a stem rotatably and reciprocably supported therein, a feeler carried on the inner portion of said stem, an indicating member carried on the outer end of said stem in alinement with said feeler, cooperating means on the inner end of said body member and on said stem for locking the stem against rotation, a nut on the outer portion of said stem engaging said body member for rendering said locking device effective, said stem and said feeler being adapted for rotation when said nut is loosened and said stem is moved longitudinally for disengaging said locking member.

8. In a device of the character described the combination with a housing, of a plug insertible in said housing, a stem rotatably and reciprocably held in said plug, a feeler carried on the inner portion of said stem, an indicating member on the outer end of said stem, alined with said feeler, and means on said stem at opposite ends of said plug for normally holding said stem and said feeler against rotation, and adjustable for rendering the same rotatable, for the purpose described.

9. In a device of the character described the combination with a housing of a plug attachable thereto, a stem rotatably and reciprocably held therein, a feeler carried on the inner portion of said stem, an indicating member carried on the outer portion of said stem in alinement with said feeler, cooperating means on the inner portion of said stem and the inner end of said plug for normally locking the stem against rotation, a nut on the outer portion of said stem for rendering said lock effective and adjustable on the stem for permitting the rotation of said stem and said feeler, for the purpose described.

10. In a device of the character described the combination with a housing of a plug attachable thereto, a stem rotatably and reciprocably held therein, a feeler carried on the inner portion of said stem, an indicating member carried on the outer portion of said stem in alinement with said feeler, cooperating means on the inner portion of said stem and the inner end of said plug for normally locking the stem against rotation, a nut on the outer portion of said stem for rendering said lock effective, and adjustable on the stem for permitting the rotation of said stem and said feeler, the inner end of said plug being recessed, and washers carried on said stem and adapted to seat in said recess for packing said plug against leakage.

JOHN E. HUNT.

Witnesses:
M. H. EGAN,
F. J. GOSS.